UNITED STATES PATENT OFFICE.

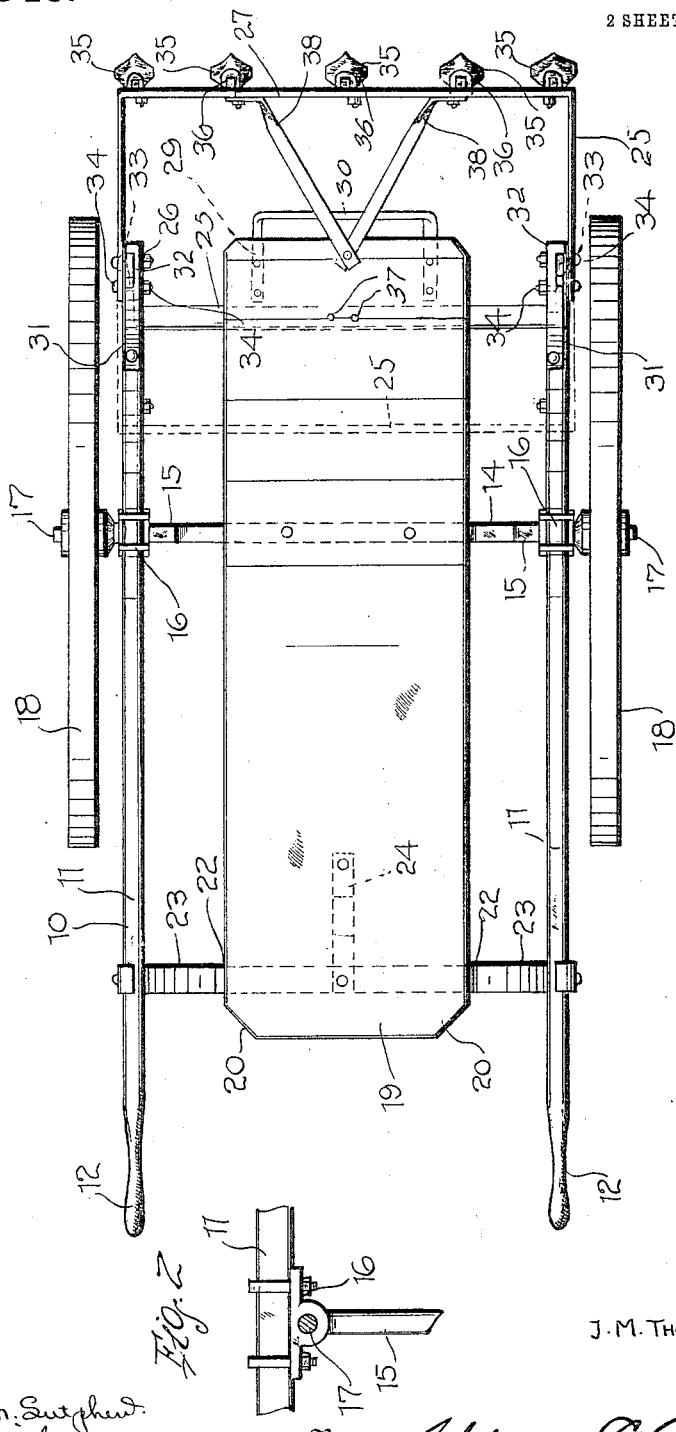

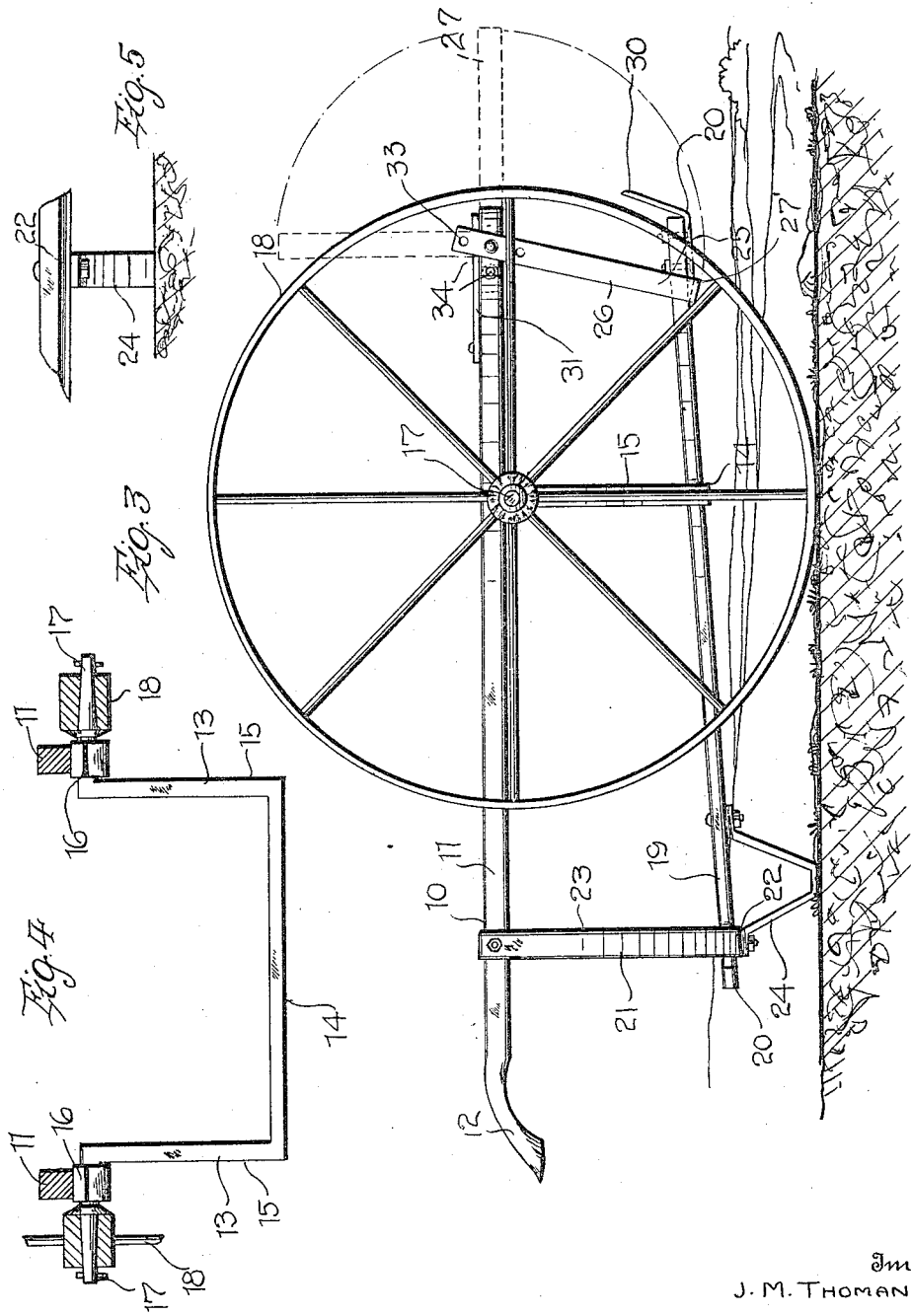

JOSIAH M. THOMAN, OF HANOVER, PENNSYLVANIA.

MILK AND BAG TRUCK.

1,127,546.   Specification of Letters Patent.   Patented Feb. 9, 1915.

Application filed March 19, 1913. Serial No. 755,493.

*To all whom it may concern:*

Be it known that I, JOSIAH M. THOMAN, a citizen of the United States, residing at Hanover, in the county of York and State of Pennsylvania, have invented certain new and useful Improvements in Milk and Bag Trucks, of which the following is a specification, reference being had to the accompanying drawings.

This invention relates to new and useful improvements in farming implements, and more particularly to a combined snow plow, cultivator and cart, the latter being especially designed for the purposes of carrying milk cans, bags or the like.

The object of this invention is the provision of a device such as described which can be adjusted to serve the purpose of a bag carrier, and also the purpose of a milk can cart, and when in this latter form it will also serve the purpose of a snow plow, the said implement being further of such construction that it can be readily converted into a cultivator, by the swinging of a pivotal member and applying cultivator shares thereto.

A further object of this invention is to improve and simplify devices of this character, rendering them comparatively simple and inexpensive to manufacture, reliable and efficient in use, and readily operated.

With the above and other objects in view, this invention resides in the novel features of construction, formations, combinations and arrangements of parts to be hereinafter more fully described, claimed and illustrated in the accompanying drawings, in which—

Figure 1 is a top plan view of my invention; Fig. 2 is a fragmentary view of one of the side bars; Fig. 3 is a side elevation of my invention; Fig. 4 is a transverse sectional view thereof; and Fig. 5 is a detail view of the supporting foot. Fig. 6 is a front elevation of the transverse portion of the pivoted frame secured to the forward ends of the side bars.

Referring to the accompanying drawings by similar characters of reference throughout the several views, the numeral 10 designates generally my improved implement which will hereinafter be termed a cart. This cart 10 consists of a pair of parallel side bars 11 formed at their corresponding ends with curved handle members 12. A U-shaped axle 13 is secured to the side bars 11 adjacent the forward ends thereof and consists of a transverse portion 14 and the opposite side members 15, the latter of which are secured to the side bars 11 in any suitable manner such as shown at 16. In the accompanying drawings, I have illustrated the upper ends of the side members mounted in suitable bearings which are secured to the under sides of the side bars 11. The outer terminals of the side members 15 are bent laterally to produce outwardly extending spindles 17 upon which are mounted the supporting wheels 18 which are of a size to extend a suitable distance below the transverse portion 14.

The body member 19 is mounted upon the transverse portion 14 of the axle and consists of a rectangular plate of any desirable length and width, the same being preferably beveled at its opposite ends, as indicated by the numeral 20. This body plate 19 may be constructed of wood, metal or any other suitable material desired according to whatever the cart is to be used for. The rear end of the body 19 is braced by a U-shaped strap 21, said strap being provided with an arch 22 arranged beneath and secured to the under side of the body 19 adjacent its rear end. The upper ends of the diverging side members 23 of the strap are secured to the rear ends of the bars 11 at their juncture with the handle members 12. A supporting foot 24 is provided which is preferably V-shape and having one end secured to the under side of the arch 22 of the strap 21 and the other end thereof secured to the under side of the body 19 adjacent the arch of the strap. This supporting foot 24 is to be used for obvious purposes such as supporting the rear end of the body of the cart when in an inoperative position, as shown in Fig. 3.

A U-shaped frame member 25 is provided, the upper ends of the side members 26 of which are pivoted to points in equal spaced relation to the forward ends of the bars 11, said frame being adapted to be disposed either above or below the side bars 11 and, at the same time, it will be noted that said frame may be disposed in a horizontal position and securely retained in such position by means of the bolts 34. The side members 26 of the frame 25 are connected by means of a transverse portion 27, as clearly illustrated in Fig. 3. A U-shaped member is provided having its offset terminals 29 secured to the under side of the body 19 at the forward end thereof and the body portion 30 of the U-shaped member projects outwardly beyond the end of the body 19 and extends upwardly at an angle relative thereto, as clearly illustrated in Fig. 3.

Latch members 31 are pivoted to the outer ends of each of the side bars 11 and are provided with the notches 32 adapted to engage the upper ends of each of the side members 26 of the frame 25 for the purpose of holding the frame 25 in its raised or lowered position, perpendicularly to the side members 11. In order that the frame 25 can be retained in the same horizontal plane as the side members 11, these said side bars and the side members 26 are formed with alined openings 33 for the reception of the bolts 34, said bolts extending through the ends of the side members 11 and the members 26 and having nuts threaded thereon to securely retain the frame 25 in the same horizontal plane as the bars 11.

When it is desired to use the cart as a bag-carrier or the like, the intermediate portion of the frame is arranged beneath the bottom of the platform 19, as illustrated in Fig. 3 and will be securely held in position by the latch members 31, which engage the upper ends of the side portions 26 and by means of suitable bolts which extend through the openings 37. It will be noted that the central or transverse portion of the frame is arranged beneath the forward end of the platform 19, in such a manner that the inner edge of the transverse portion bears against the under face of the platform and the member is then held in position by means of bolts extending up through the same and through the openings 37 in the platform. It will be apparent from the foregoing that when the side portions of the frame 25 are disposed in a substantially perpendicular position, the frame will be held in such position by means of the pivoted latches 31, but when the same is held in a horizontal position, a second bolt is extended through the end of the same to retain it in such position. The upper ends of the side members 26 of the frame will be securely held against lateral movement by means of the pivoted latch members 31.

When the frame 25 has been arranged in the position described above, it will be apparent that upon tilting the forward end of the cart, the U-shaped member 30 will be disposed parallel to the ground and upon the forward movement of the cart will engage beneath the bag, barrel or the like and upon further tilting of the cart in an opposite direction, the bag or barrel will be disposed upon the body 19 and held thereon against displacement by the side bars 11.

When it is desired to use the device as a milk cart, the frame 25 is swung upwardly and arranged above the side bars 11 in a substantially vertical position, as illustrated by dotted lines in Fig. 3 and will be held against movement by the pivoted latches 31. The frame 25, when in this position, will engage the upper end of the adjacent milk can deposited upon the body, holding the same against any forward movement when the cart is tilted.

When it is desired to use the cart as a cultivator, the frame 25 is swung to a position in the same plane as the side bars 11 and retained in such position by the bolts 34 which are then passed through the alined openings 33 securely retaining the frame in the aforesaid position. The cultivator shares 35 are then secured to the transverse portion 27' of the frame 25 by means of the U-bolts 36 and obviously a cultivator is produced which will be much more effective than the low small wheeled cultivators now in use. Brace members 38 are provided, said brace members having one of their ends secured to the transverse portion 27 and their other ends secured to the forward end of the body 19.

What I claim is:—

1. A device of the class described including parallel side bars, a U-shaped axle supporting said bars, said axle having its ends outwardly turned and wheels mounted thereon, a body member supported by the axle and a pivoted frame attached to the ends of the side members, as and for the purpose set forth.

2. A device of the class described including a U-shaped axle having its upper ends outwardly turned, parallel bars supported by the upper ends of said axle and wheels mounted upon the outturned ends of the axle, a body member supported at its intermediate portion upon the transverse portion of said axle, a strap having its ends secured to the side bars and supporting one end of said body and a pivoted frame attached to the other ends of the side bars and adapted to normally support the forward end of the body.

3. A device of the class described including a U-shaped axle, wheels supporting said axle, parallel side bars mounted upon the upper ends of the axle, a body member having its central portion supported by the axle, a strap member supporting one end of the body, a pivoted frame attached to the forward ends of the side bars and adapted to normally support the forward end of the body, and pivoted catch members adapted for engagement with the ends of the frame to retain the same in its operative position.

4. A device of the class described including a supporting axle having wheels mounted upon each end, parallel side bars supported by the axle, a body member arranged between the side bars and secured to the axle, a pivoted U-shaped frame having its ends attached to the forward ends of the bars and adapted to normally support the forward end of the body, pivoted catch members having recesses formed in their outer ends and adapted for engagement with the side portions of said frame to retain the same in its normal position, said frame being adapted to be arranged in a vertical position above the side bars, and further adapted to be disposed in a position on a horizontal plane with the side bars and means for retaining said frame in the last mentioned position.

In testimony whereof I hereunto affix my signature in the presence of two witnesses.

JOSIAH M. THOMAN.

Witnesses:
DALE M. STEGUR,
PAUL E. LAU.

Copies of this patent may be obtained for five cents each, by addressing the "Commissioner of Patents, Washington, D. C."